July 30, 1968
E. E. ROSS ET AL
3,394,805
TAPERED AGRICULTURAL PRODUCT ORIENTING AND
FEEDING APPARATUS AND METHOD
Filed Feb. 28, 1966
4 Sheets-Sheet 1
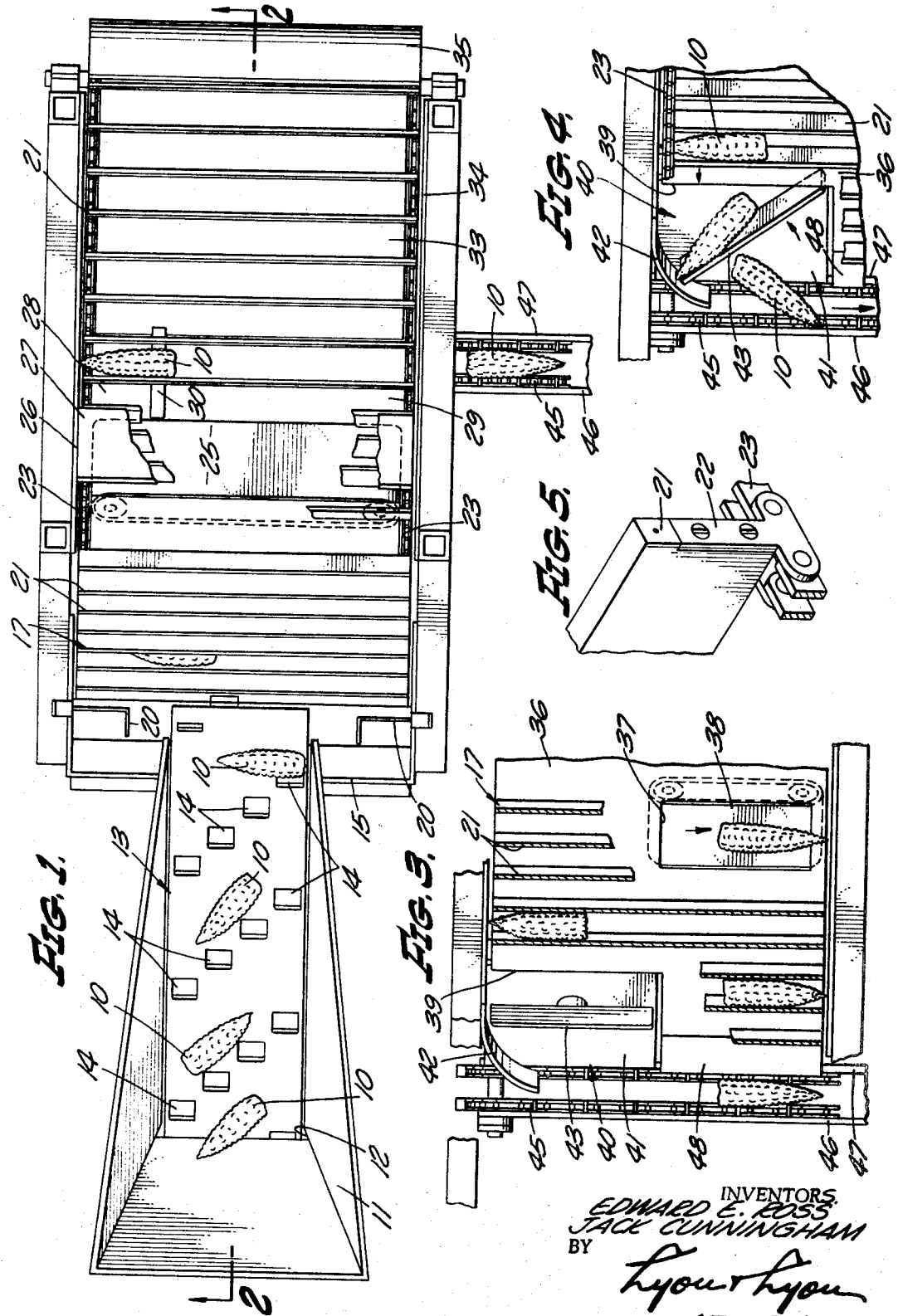
INVENTORS.
EDWARD E. ROSS
JACK CUNNINGHAM
BY
Lyon & Lyon
ATTORNEYS

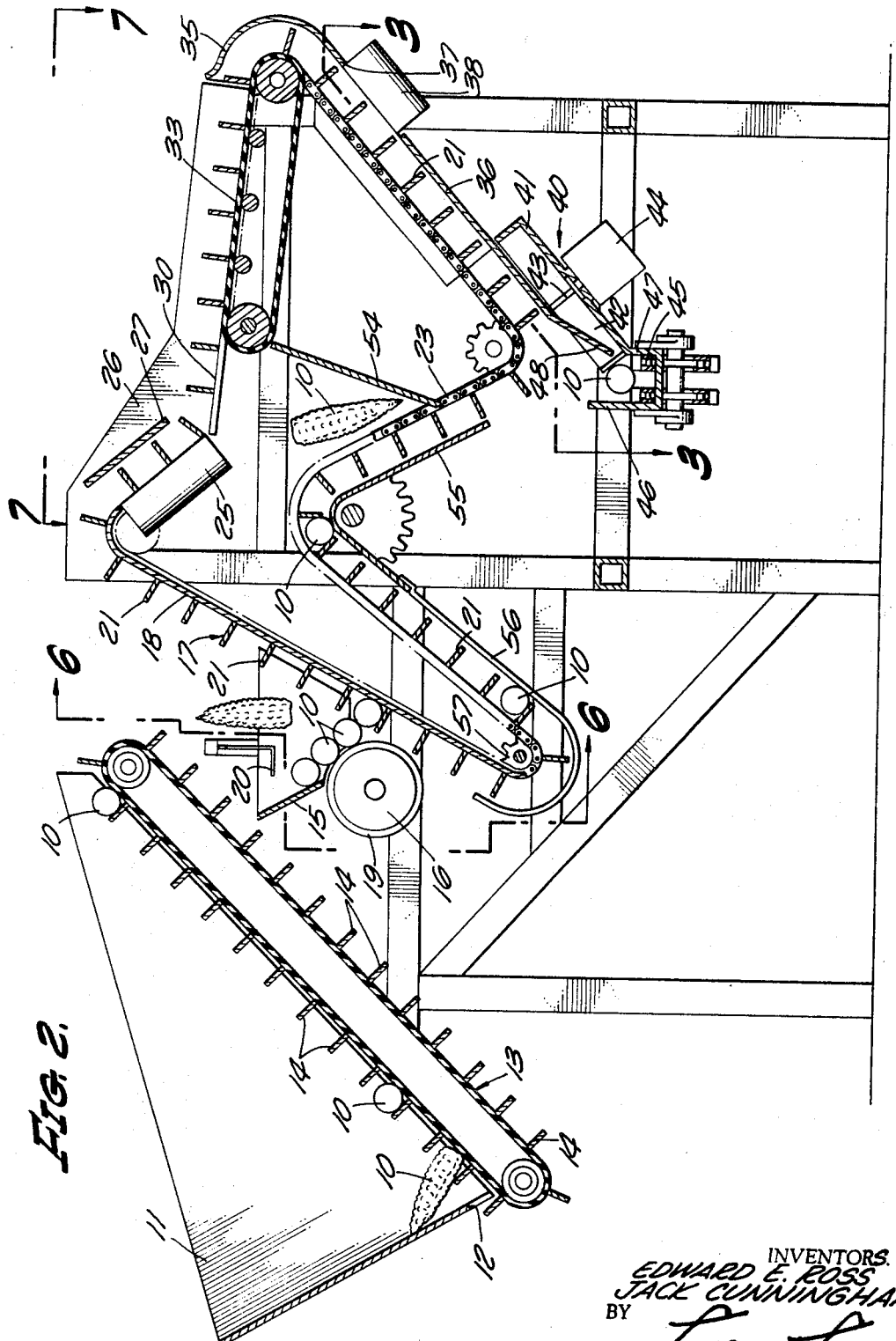

July 30, 1968  E. E. ROSS ET AL  3,394,805
TAPERED AGRICULTURAL PRODUCT ORIENTING AND
FEEDING APPARATUS AND METHOD
Filed Feb. 28, 1966  4 Sheets-Sheet 3

INVENTORS.
EDWARD E. ROSS
JACK CUNNINGHAM
BY
Lyon & Lyon
ATTORNEYS

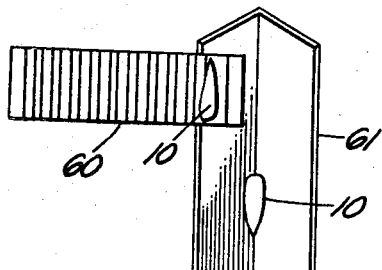
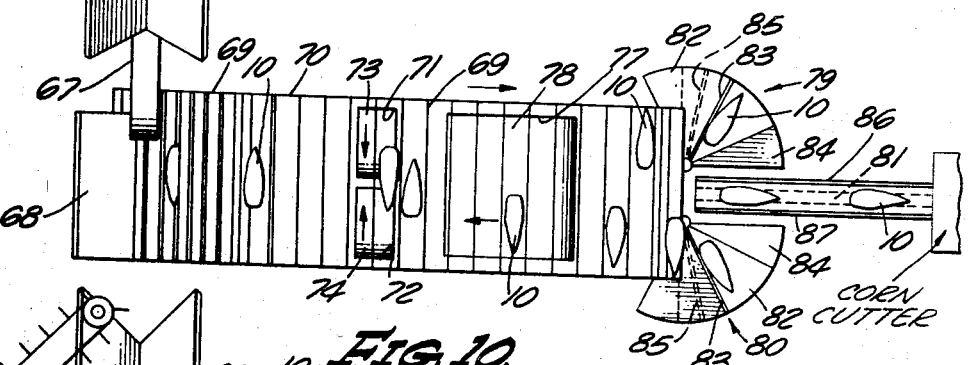
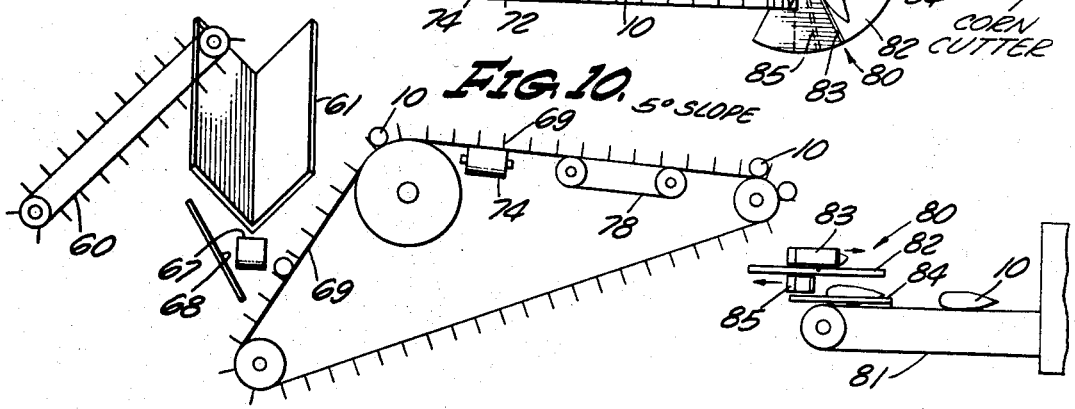
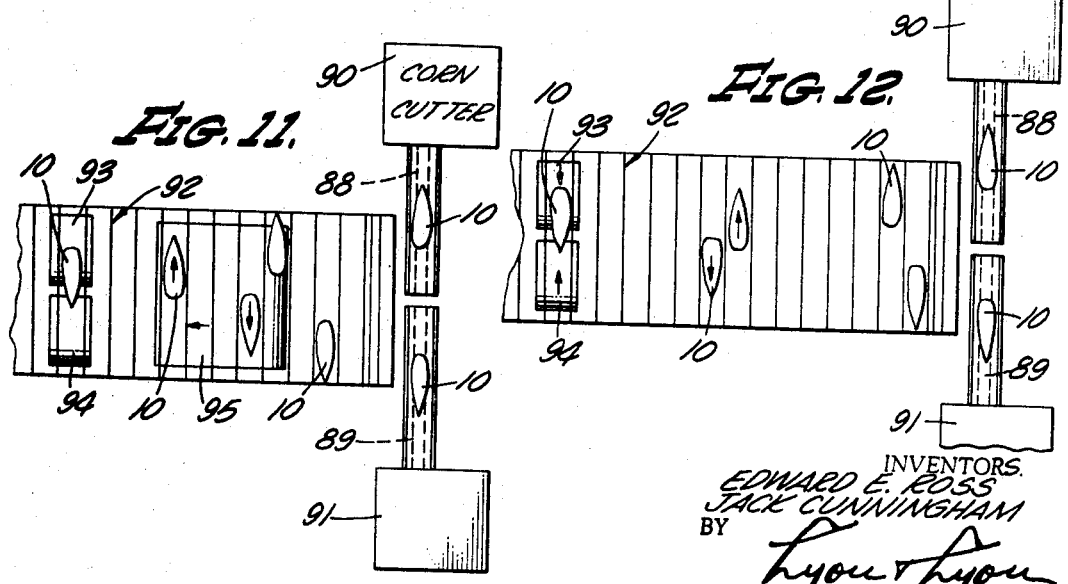

United States Patent Office 3,394,805
Patented July 30, 1968

3,394,805
TAPERED AGRICULTURAL PRODUCT ORIENTING AND FEEDING APPARATUS AND METHOD
Edward E. Ross and Jack Cunningham, San Francisco, Calif., assignors to California Packing Corporation, San Francisco, Calif., a corporation of New York
Filed Feb. 28, 1966, Ser. No. 530,449
27 Claims. (Cl. 209—73)

ABSTRACT OF THE DISCLOSURE

Apparatus and method for orienting tapered agricultural products (e.g., husked ears of corn). Products are carried in pockets formed by a flighted conveyor. During movement of the conveyor the products are oriented toward one edge or the other by passing them downwardly over an upwardly moving inclined belt. Before such orientation products in excess of one in each pocket and undersized products are removed. Products are removed from the edges of the conveyor and deposited on feed conveyor means, with their axes in alignment and the small ends pointing in the same direction.

---

This invention relates to the processing of agricultural products and more particularly relates to a method and apparatus for orienting tapered agricultural products such as corn, carrots, turnips, parsnips and the like.

In U.S. patent application Ser. No. 308,025, filed Sept. 10, 1963 now abandoned by Edward E. Ross, Jack Cunningham and Fred Hartman there was disclosed apparatus that is useful for orienting ears of corn with their butt ends in the same direction preparatory to the feeding of the corn into butt cutting and husking apparatus. Other apparatus for the same purpose is disclosed in application Ser. No. 394,486 filed Sept. 4, 1964 now abandoned by the same inventors. Additional automatic apparatus for feeding the ears of corn to such orienting apparatus is disclosed in application Ser. No. 496,041 filed Oct. 14, 1965 now Patent No. 3,326,351 by the present inventors. All of the preceding applications are assigned to the assignee of the present application and all the inventions disclosed therein are designed to be included in processing apparatus that automates the processing of tapered agricultural products such as corn from the time it is delivered to the processing plant to the time is is completely processed. Such automation significantly reduces the cost and uncertainty of the processing as it eliminates the presently required manual labor which is high in cost and of uncertain availability.

The apparatus and method of the present invention are utilized for orienting husked ears of corn prior to their being fed to a machine called a "corn cutter" which removes the corn kernels from the cob. Presently available corn cutters require that the ears of corn be fed to it properly oriented, preferably with the small end of each ear being fed into the machine first. While the apparatus described in either of the above-identified patent applications Ser. No. 308,025 or Ser. No. 394,486 orients the corn prior to its being fed to the husker and butt cutter, this orientation cannot be maintained since it must be washed after it is husked and otherwise moved around so as to make holding the orientation impractical.

According to the present invention, a method and apparatus are provided for sorting out underlength tapered agricultural products and for automatically orienting the remaining products. This automatic orienting is accomplished by positioning the product, such as husked ears of sweet corn, in the pockets of a downwardly inclined bottomless flighted conveyor and driving the conveyor downwardly across an upwardly inclined belt moving in the opposite upward direction so that each ear of corn is caused to move to the edge of the conveyor to which its smaller end points. Each ear that is driven to one edge of the belt is deposited directly on a feeder chain while each of the ears driven to the other edge of the belt is turned around one hundred and eighty degrees and then deposited on the feeder belt. The method and apparatus provided thus eliminates the need for a worker to pick up each ear of corn from a disorganized mass, orient it in one direction and place it on the feeder chain. The processing cycle is thus considerably speeded up and the efficiency of the rest of the processing machinery can be increased. Elimination of the manual orienting further eliminates a dangerous safety hazard.

It is therefore an object of the present invention to provide a method for orienting tapered agricultural products.

It is another object of the present invention to provide apparatus for automatically orienting tapered agricultural products.

It is also an object of the present invention to provide such a method and apparatus whereby tapered agricultural products are caused to become oriented in the minimum possible time and space.

It is a further object of the present invention to provide such a method and apparatus whereby underlength products are removed before the remainder are oriented.

It is a still further object of the present invention to provide completely automated apparatus for removing individual tapered agricultural products from a disorganized mass of the same and orienting the individual products with their small diameter ends in the same direction.

It is another object of the present invention to provide apparatus for automatically and continuously converting a disorganized mass of tapered agricultural products into a stream of properly oriented products.

These and other objects and advantages of the present invention will become more apparent upon reference to the accompanying description and drawings in which:

FIGURE 1 is a top plan view of a first embodiment of the apparatus of the present invention;

FIGURE 2 is a cross-sectional view taken along lines 2—2 of FIGURE 1;

Figure 6:
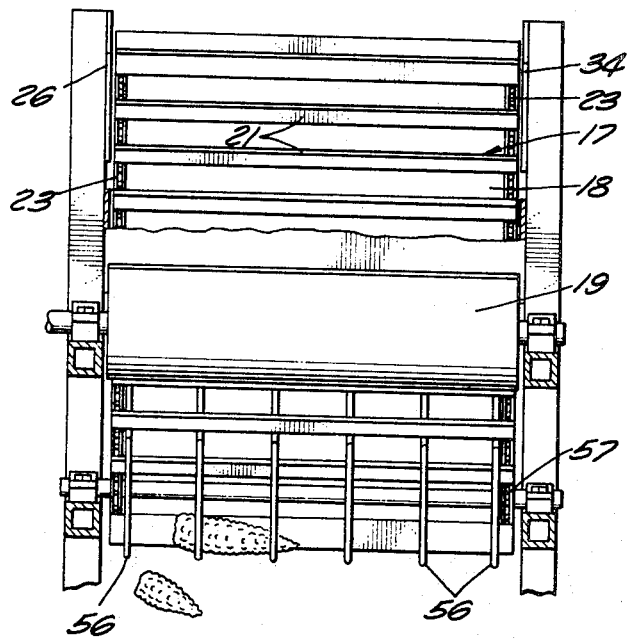
Figure 7:
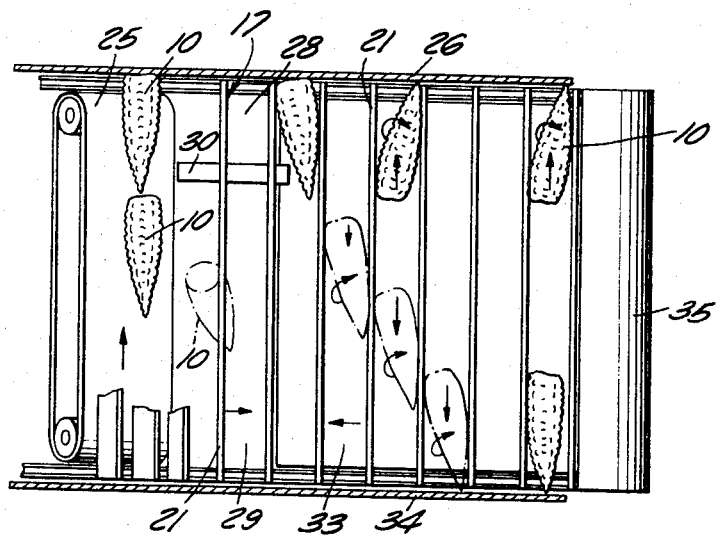
Figure 8:
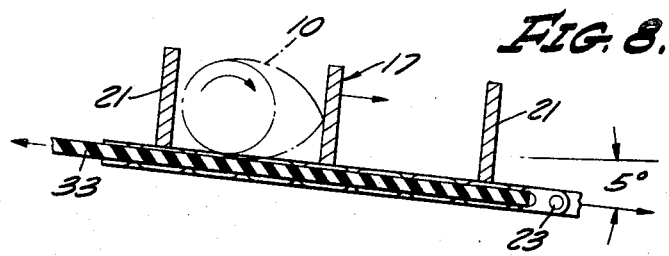

FIGURE 3 ls a cross-sectional view taken along lines 3—3 of FIGURE 2;

FIGURE 4 is a detailed view of the turnaround mechanism shown in FIGURE 2;

FIGURE 5 is an enlarged detail of one flight of the flighted conveyor used in the apparatus;

FIGURE 6 is a cross-sectional view taken along lines 6—6 of FIGURE 2;

FIGURE 7 is a view taken along lines 7—7 of FIGURE 2 showing how the ears of corn are driven to the sides of the flighted conveyor;

FIGURE 8 is an enlarged sectional detail of a portion of the apparatus shown in FIGURE 7;

FIGURE 9 is a top plan view of a second embodiment of the apparatus of the present invention;

FIGURE 10 is a schematic side view of the apparatus shown in FIGURE 9;

FIGURE 11 is a schematic top plan view of a third embodiment of the apparatus of the present invention; and FIGURE 12 is a schematic top plan view of a fourth embodiment of the apparatus of the present invention.

Turning now to FIGURES 1 through 8, there is shown a first embodiment of the apparatus of the present invention. A disorganized mass of ears of corn 10 are positioned in a hopper 11 having an opening 12 in the bottom across which passes a metering conveyor 13. The metering conveyor 13 is provided with a plurality of cleats 14 arranged to form cleat pockets and which serve to contact and remove the bottom layer of corn from the hopper. Many patterns, sizes and shapes of cleats on the conveyor will do a satisfactory job of metering. A rectangular shaped cleat, three inches wides and two inches high arranged in a diagonal pattern, gives satisfactory performance. The height of the cleat should be approximately equal to the diameter of the largest ear of corn so that they will support only one layer of corn on the metering conveyor.

The angle of the metering conveyor 13 must be steep enough so that excess corn above the cleats will fall back but not so steep that corn will fall out of the cleat pockets. It has been found that the former will occur at angles less than approximately thirty degrees while the latter will occur at angles of more than approximately eighty degrees. Any angle between thirty degrees and eighty degrees is thus satisfactory although forty-five degrees has been found to be the most effective angle. The length of the metering conveyor 13 should be long enough to allow excess ears above the cleats to fall back into the hopper. A satisfactory length has been found to be two and one-half feet. The conveyor could be longer without impairing operation but would add to the cost and space required. Reducing the conveyor length would not render the machine inoperative but does reduce the evenness of feed. The conveyor itself should be as narrow as possible without causing the longest ear of corn to wedge between the sides of the hopper 11. A width of twelve inches has been found satisfactory. Wider conveyors will work but will cause the feeding to become more sporadic.

As the ears of corn 10 reach the apex of the metering conveyor 13, they fall into a feed hopper 15, the side of which is inclined sufficiently to cause the ears of corn to slide downward and contact a feed roller 16 which revolves toward a bottomless flighted conveyor 17 moving across an inclined feed table 18 which forms the other side of the hopper 15. The dimensions of the feed hopper 15 are not critical and any shape of hopper can be used as long as the side is inclined sufficiently to slide the ears 10 to the revolving feed roller 16 and is wide enough to prevent the ears from wedging between its sides. A flat bottom hopper twenty-four inches wide with its side inclined at about forty-five degrees is satisfactory.

As the ear 10 contacts the feed roller 16, it is pushed toward the pocket of the flighted conveyor 17. At this point, the ear is most probably unaligned relative to the pockets. If the ear is already aligned parallel to the pocket as it is pushed toward it, it will fall directly into it. If the ear is not aligned with the pocket and only one end contacts the pocket, the other end will immediately be forced around and into the pocket by the feed roller. The length of the revolving feed roller 16 is not critical and a twenty-two inch wide roller having a diameter of six inches has been found satisfactory. The roller is preferably wrapped in rubber matting 19 to reduce damage and increase friction between the ears 10 and the roller surface. The diameter of the roller 16 should be of sufficient size so that if the ear should be perpendicular to the flights of the conveyor so that only the nose of the ear contacts the flight, the roller will contact the other end of the ear to push it around parallel and into the pocket.

Conventional electric contact probes 20 are provided over the feed hopper 15 to shut off the metering conveyor 13 in the event that the metering conveyor feeds more corn to the feed hopper 15 than can be removed by the flighted conveyor 17. The probes will operate to shut off the metering conveyor for a controllable period until the corn is removed by the flighted conveyor 17.

The ears of corn 10 are carried up the inclined table 18 by the flighted pockets of the conveyor 17. The conveyor 17 is preferably formed of a number of slats 21 bolted to lugs 22 mounted on drive chains 23, as best shown in FIGURE 5. Any excess corn not in the pocket will fall back due to the steep angle of flight travel and will re-enter a subsequent pocket. At this point there may be one to several ears of corn in each pocket, but not more than one layer. The angle of steepness of the table 18 is not critical so long as it is steep enough to allow ears to fall back if not in one layer in the pockets but not so steep that they will fall out of the pockets. An angle of approximately sixty degrees is necessary to cause the ears to fall back and the ears will fall out of the pocket if the angle is greater than ninety degrees. More flights have been found to be filled at an angle of seventy degrees than at any other angle.

The pockets of the flighted conveyor 17 should be wide and deep enough to admit one ear easily, but not so wide and deep so that two ears can enter the pocket at any one point; that is, ears may be tip to tip over the length of the pocket but should not be able to enter the pocket side by side or one on top of the other. Pockets three inches wide, one and one-half inches deep and twenty-four inches long have been found to be satisfactory. It should be understood that these dimensions, and all of the dimensions given in this specification, are intended to be illustrative only and not limiting and have been found to be satisfactory for the processing of husked sweet corn. It should be obvious that in the processing of other tapered agricultural products, for example, carrots, different values would be required for the various dimensions.

After the ears reach the apex of the conveyor 17, they come in contact with a tabletop conveyor 25 moving laterally across the table toward the left side of the apparatus. As the ears contact this conveyor, they are pulled along the length of the flighted conveyor pocket until the first ear in the pocket bumps into the side wall 26 of the apparatus and each succeeding ear in the pocket bumps into the preceding ear. A cover plate 27 is provided on the left side of the apparatus to push back into succeeding flight any ears that may have gotten doubled up in the flights. The tabletop conveyor 25 should be wide enough and run fast enought to remain in contact with the ears long enough to insure that they are pulled over until they bump the side wall 26 of the apparatus. A width of five and one-quarter inches and a speed of one hundred feet per minute was found sufficient to accomplish this. The belt must not be run fast enough to cause the ears to buckle or wedge side by side in the flight. The tabletop conveyor 25 should also be provided with a downward slope which is sufficiently steep to cause the ears to rest on the backward side of the forward flight of each pocket. This helps to avoid wedging of the ears in the pocket.

After the flighted conveyor 17 crosses the tabletop conveyor 25, it passes over small and large dropthrough holes 28 and 29, best shown in FIGURE 7. A gauge bar 30 divides the small and large dropthrough holes 28 and 29 and supports only the desired length ears over the dropthrough area. If there are more than one ear in the pocket, the excess ears drop through the large hole 29. The gauge bar 30 is adjusted so that ears below a desired length will be dropped through the hole 28. In the processing of sweet corn, it is generally desired that ears less than three inches long be discarded as they tend to clog up the corn cutter. After the flights of the conveyor 17 pass the dropout holes, there will be only one ear left per flight. All will be positioned along the left side of the flight pockets in contact with the side wall 26 and all will be of sufficient length for feeding to the cutter.

The single line of ears of corn now encounter an inclined orienter belt 33 whose top surface is moving in the direction opposite to that of the flighted conveyor 17. The combination of the flights moving forward and the orienter belt 33 moving in the opposite direction causes the ear in each pocket to spin. The larger diameter end of the ear will travel farther per revolution than the smaller diameter end of the ear causing the ear to become cocked in the pocket and therefore causing it to move sideways toward its smaller diameter end. If the flighted conveyor 17 and the orienter belt 33 are inclined slightly from the horizontal so that the belt 33 is moving upwardly, it has been found that a much faster sideways movement results since gravity helps to keep the orienter belt 33 from pushing the cocked ear of corn against the back bar of the flighted pocket and thereby straightening the ear. Those ears whose small ends were pointing at the side wall 26 will remain in place; those ears which were pointed at the other side wall 34 will move across the pocket until they engage wall 34. Upon reaching the end of the orienter belt 33, each ear will thus be positioned against the side of the machine 26 or 34 towards which its small end is pointed. The movement of an ear in this manner is shown in FIGURES 7 and 8.

The belt 33 should run fast enough to cause most of the ears to move to the side of the machine by the time they reach its end, but not fast enough to cause them to bounce. The tilt or inclination from the horizontal should be sufficient to keep the orienter belt 33 from pushing the ear against the back of the flight pocket, but not enough that it will roll against the front of the pocket. An angle of five degrees has been found to be satisfactory. A belt width of eighteen inches has also been found to be satisfactory. It should be understood that neither the belt nor the tilt is essential to the sideways ear movement although they cause it to occur in a much shorter distance of travel of the flighted conveyor 17. If the ears were merely dragged along a flat motionless table by the flight pocket, and if the table was long enough, they would still move sideways although the distance required for this operation would be much greater.

As the ears reach the end of the belt 33, they pass around it, being held in the flighted pockets by a guard plate 35. After leaving the confines of the guard plate 35, the ears pass onto a plate 36 which maintains them in the flighted pockets. The plate 36 is provided with a cutout portion 37 in its upper right hand area. The upper surface of a tabletop conveyor 38 is positioned within the opening 37 and runs in a lateral direction toward the right side of the machine. The conveyor 38 acts upon any ears which for some reason did not move all the way over to the right side of the machine and pulls them the rest of the way over until they engage the side 34. The width and speed of this conveyor 38 should be sufficient to pull the ears all the way to the side. The conveyor should be short enough so as not to disturb or contact those ears travelling down the left side of the machine. A conveyor speed of one hundred and fifty feet per minute, a width of four and one-half inches and a length of twelve inches have been found to be satisfactory.

The plate 36 is provided with another opening 39 at its lower left hand corner. Below this opening 39 there is positioned a turnaround mechanism generally indicated at 40. The turnaround mechanism 40 comprises a bottom plate 41 and an arcuate side guide 42 together with a rotatable plate 43 driven by a suitable motor or gear box 44. When the ears travelling down the left side of the machine come to the cutaway portion 39 they drop out of the pockets of the flighted conveyor onto the plate 41 behind the plate 43. The turnaround mechanism 41 is tilted so that the ear will rest against the plate 43 upon initial contact with the turnaround mechanism. As the plate 43 is rotated, the ear is turned around one hundred and eighty degrees. After the plate 43 has revolved one hundred and eighty degrees, the ear by a combination of gravity and centrifugal force will fall away from the plate 43 and onto the cutter feed chain 45 which may be the conventional feed chain now in use. In order to prevent the ears from bouncing off the feed chain, it is provided with suitable restraining walls 46 and 47.

The movement of the rotating bottom plate 43 must be exactly timed with the flights of the conveyor 17 so that it will turn one hundred and eighty degrees or one-half revolution for each flight that passes over it. The timing of this plate 43 must also allow for the drop of the ear from the plate 36 to the plate 41. The side guide 42 is necessary to ensure that the ear is not thrown out of the turnaround mechanism 40 before it reaches the full one hundred and eighty degree turn. The height of plate 43 should be sufficient to hold an ear of corn but not high enough to catch on the flights of the conveyor 17. The length of the plate 43 is not critical but it should be long enough to engage the longest ear of corn securely. A height of two inches and a length of twelve inches has resulted in satisfactory performance.

The ears travelling down the right side of the plate 36 are already pointed small end first toward the corn cutter and it is consequently not necessary to turn them around. They stay in the pockets of the flighted conveyor 17 until they reach the end of the plate 36 whereupon they drop off by gravity onto the feed cutter chain 45. To reduce the distance that the ears fall, the plate 36 is preferably provided with a depressed lip 48.

In order to avoid dropping one ear on top of the other, for example, dropping an ear which has not gone through the turnaround device on top of one which has gone through it, the speed of the feeder chain 45 and the dropoff point of the ears on the right side of the machine must be precisely chosen. If the speed of the chain is too fast, or the point of dropoff is too late, the ear processed through the turnaround mechanism 40 will reach a position beneath the lip 48 too quickly and cause one ear to drop on top of another. If the speed of the chain is too slow or the point of dropoff is too soon, the same thing will happen. Preferably, the chain 45 is of lugged chain rather than the standard roller chain as this results in better gripping action upon the ears and the ears do not slip or become caught as often.

As will be recalled, the ears in each pocket of the flighted conveyor 17 in excess of one were eliminated by means of the dropthrough hole 29. Similarly, underlength ears were eliminated by means of the dropthrough hole 28. The ears that drop through the dropthrough holes are deflected by a plate 54 into the pockets of the returning flighted conveyor where they are held by means of a plate 55. A plurality of rods 56 are connected to the end of the plate 55 and are formed so as to continue around the sprocket 57 and provide support for the ears in the flighted pockets. However, the rods 56 are separated sufficiently so that underlength ears, for example, ears under three inches in length, will not be supported and will fall between the rods so that they can be removed from the apparatus. The full size ears are returned to the processing apparatus by the conveyor 17.

Turning now to FIGURE 9, there is shown a second embodiment of the present invention. In this embodiment, the ears 10 are fed by a belt 60 to a chute 61 which is dimensioned so as to cause each ear of corn to be aligned longitudinally and to slide down onto an accelerator belt 67 which speeds up the movement of the ear and projects it into a feed trough 68, one side of which comprises a flighted conveyor 69 which removes the ears from the feed trough 68. This apparatus is similar to that disclosed in the aforementioned application Ser. No. 596,041, to which reference may be made for the details of this apparatus.

The flighted conveyor 69 moves the ears across a feed table 70. The feed table 70 is provided with first openings 71 and 72, in which are positioned tabletop conveyors 73 and 74, respectively. The conveyors 73 and 74 run in opposite directions and serve to move the ears to the approximate center of the table. The centered ears are now moved along the table 70 until they reach another opening therein 77 in which is positioned an orienting belt 78 whose top surface runs in a direction opposite to the direction of movement of the flighted conveyor 69. In the same manner as was discussed previously with regard to the flighted conveyor 17 and the orienting belt 33, the ears are caused to move to the side of the table to which their smaller ends point. In the same manner as was discussed above, the distance required to move the ears to the sides of the table can be shortened by inclining the orienting belt slightly from the horizontal, for example, at an angle of five degrees.

At the end of the table 70, there is provided a pair of right angle positioning devices 79 and 80 which serve to receive the ears from the flighted conveyor 69 and deliver them to the cutter feed chain 81. The right angle positioning device 80 comprises a plate 82 which is positioned below the right-hand side of the conveyor 69 and onto which the ears travelling down the right-hand side of the conveyor are dropped. The plate 82 is swept by a pusher plate 83 which pushes the ears over the edge of the plate 82 onto a second plate 84. The plate 84 is also swept with a pusher plate 85 which pushes the ears off the plate 84 and onto the feed chain 81. The feed chain is provided with side walls 86 and 87 to prevent the ears from bouncing off the chain 81. Each of the pusher plates 83 and 85 swing through a forty-five degree angle and their drives are arranged so that when the plate 83 is moving forward or clockwise, the plate 85 is moving backward or counterclockwise. The right angle positioning device 79 is identical to the device 80.

FIGURE 11 shows a third embodiment of the present invention which is similar in all respects to the embodiment of FIGURES 9 and 10 with the exception that two feed chains 88 and 89 feeding separate cutters 90 and 91 are provided instead of right angle positioning devices. A flighted conveyor 92 cooperates with tabletop conveyors 93 and 94 and orienting conveyor 95 in the same manner as these elements cooperated in the embodiment of FIGURES 9 and 10 to position the ears of corn at the edge of the apparatus towards which their smaller diameter ends point. The ears then fall off onto the respective feed chains and are conveyed to the cutters.

FIGURE 12 shows a fourth embodiment of the present invention. This embodiment is similar in all respects to that shown in FIGURE 11 with the exception that the orienting belt 95 is not used. As was point out previously, this orienting belt is not necessary if the length of the table across which the flighted conveyor pulls the ears of corn is made longer. As can be seen, this is what has been done in the embodiment of FIGURE 12.

From the foregoing description, it can be seen that a method and apparatus for orienting tapered agricultural products such as husked sweet corn has been provided. By use of the present invention, no manual labor is required for taking the products from a disorganized mass of the same and converting them into a stream in which the smaller diameter ends of the products are pointed in the same direction. While the present invention has been described in connection with a conventional corn cutter which receives the corn small end first, it should be obvious that the invention is not limited in this regard. For example, if the final processing device was arranged to receive the products large end first, all that would be required is that the direction of movement of the feed chain and the turnaround device be reversed. The driving and synchronizing motors, belts, gears and the like have not been illustrated as they are conventional and their construction and arrangement will be obvious to those skilled in the art.

The invention may be embodied in other specific forms not departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:
1. A method of processing tapered agricultural products, comprising:
   placing the products in elongated enclosures having a longitudinal dimension greater than the length of said products and a lateral dimension less than the length of said products but greater than the diameter thereof;
   moving an endless belt in a first upwardly inclined direction;
   engaging and supporting said products with said belt; and
   moving said enclosures across said belt in a downwardly inclined direction opposite to the direction of movement of said belt and with their longitudinal dimension substantially perpendicular to the direction of movement of said belt whereby said products are caused to spin and move in the direction of their smaller ends toward the ends of the enclosures.

2. The method of claim 1 including the further step of removing said products from said enclosures after said products have moved to the ends of said enclosures while maintaining the orientation of said products.

3. The method of claim 2 including the further step of reversing the orientation of each product removed from one end of each of said enclosures.

4. Apparatus for processing tapered agricultural products comprising:
   first inclined conveyor means having a plurality of parallel bottomless pockets formed therein, each of said pockets extending across said conveyor means and being longer than the length of said products and wider than the diameter of said products;
   second inclined conveyor means positioned below a portion of said first conveyor means and forming a bottom for said pockets;
   means for depositing said products in said pockets;
   means for driving said first conveyor means in a first downward direction; and
   means for driving said second conveyor means in the opposite upward direction
   whereby the products are subjected to spinning action with movement in the directions pointed by their small ends.

5. The apparatus of claim 4 wherein said first and second conveyor means are inclined at an angle of the order of 5° from the horizontal.

6. The apparatus of claim 4 wherein means are provided for removing said products from said pockets after said pockets are driven across said second conveyor means.

7. The apparatus of claim 6 wherein said removing means includes means for reversing the endwise orientation of the products at one end of said pockets.

8. Apparatus for processing tapered agricultural products comprising:
   a bottomless inclined flighted conveyor, the flights of said conveyor being longer than said products and being spaced apart by a distance less than the length of said products but greater than the diameter thereof;
   means forming a bottom for said flighted conveyor, said means including as a portion thereof inclined belt means positioned below said flights of said conveyor;
   means for driving said flighted conveyor in a first downward direction;
   means for driving said belt means in a second upward direction;
   means for positioning said products between the flights of said conveyor prior to said flights being driven across said belt means whereby said products are caused to be moved to the edge of said flighted conveyor toward which their smaller diameter ends point when they are driven across said belt means; and means for removing said products from the edges of said flighted conveyor.

9. The apparatus of claim 8 wherein said belt means is inclined at an angle of the order of 5° from the horizontal.

10. The apparatus of claim 8 wherein feed conveyor means are provided for receiving the products removed from said flighted conveyor.

11. The apparatus of claim 10 wherein said removing means includes means for delivering products at one edge of said flighted conveyor directly to said feed conveyor means without changing their orientation and revolving means for reversing the direction of products at the other edge of said flighted conveyor and delivering said reversed products to said feed conveyor means.

12. The apparatus of claim 11 wherein said revolving means comprises a first plate for receiving said products from said flighted conveyor, an arcuate side plate mounted adjacent to said first plate to prevent premature ejection of said products, and a third plate rotatably mounted on said first plate, said products resting against said third plate when they are received from said flighted conveyor, rotation of said third plate causing the direction of said product to be reversed.

13. Apparatus for processing tapered agricultural products comprising:

a bottomless flighted conveyor, the flights of said conveyor being longer than said products and being spaced apart by a distance less than the length of said products but greater than the diameter thereof whereby pockets are formed for receiving said products;

means forming a bottom for said flighted conveyor, said means including a first endless belt having a direction of movement perpendicular to the direction of movement of said flighted conveyor and a second endless belt having a direction of movement opposite to the direction of movement of said flighted conveyor;

means for positioning said products in said pockets of said flighted conveyor prior to said pockets being driven across said first endless belt whereby said products are driven to one edge of said flighted conveyor by said first endless belt;

means between said first endless belt and said second endless belt for removing all but one product from each pocket;

movement of said products in said pockets across said second endless belt causing said products to move to the edge of said flighted conveyor toward which their smaller diameter ends point;

feed conveyor means for conveying said products away from said flighted conveyor;

means for depositing the products adjacent one edge of said flighted conveyor on said feed conveyor means without disturbing the orientation thereof; and means for reversing the orientation of the products adjacent the other edge of said flighted conveyor and delivering them to said feed conveyor means.

14. The apparatus of claim 13 wherein said second endless belt and said flighted conveyor as it passes across said second endless belt are inclined from the horizontal.

15. The apparatus of claim 13 wherein said means positioned between said first and said second endless belt comprises an opening formed below said flighted conveyor and wherein means are provided for returning the products dropped through said opening to another pocket of said flighted conveyor.

16. The apparatus of claim 13 wherein said means for depositing said products in said pockets comprises a feed hopper, cleated conveyor means for removing said products from a disorganized mass of the same, and a feed roller positioned at the bottom of said feed hopper for forcing said products into said pockets.

17. Apparatus for processing tapered agricultural products comprising:

a bottomless inclined flighted conveyor, the flights of said conveyor being longer than said product and being spaced apart by a distance less than the length of said products but greater than the diameter thereof whereby pockets are formed for receiving said products;

means forming an inclined bottom for said flighted conveyor;

means for positioning said products in said pockets of said flighted conveyor;

means for driving said flighted conveyor downwardly across said bottom forming means whereby movement of said products in said pockets causes said products to move to the edge of said flighted conveyor toward which their smaller diameters point;

feed conveyor means for conveying said products away from said flighted conveyor; and means for removing said products from the edges of said flighted conveyor and depositing them with their axes aligned on said feed conveyor means.

18. The apparatus of claim 17 together with means for driving the bottom forming means in a direction opposite to the driving movement of the flighted conveyor.

19. Apparatus for processing tapered agricultural products comprising:

a bottomless flighted conveyor, the flights of said conveyor being longer than said product and being spaced apart by a distance less than the length of said products but greater than the diameter thereof whereby pockets are formed for receiving said products;

an upwardly inclined table positioned under a portion of said flighted conveyor and serving as a bottom for the pockets thereof;

a first endless belt positioned beneath a second portion of said flighted conveyor adjacent said table, and serving as a bottom for the pockets thereof, said endless belt being inclined downwardly and being driven in a direction perpendicular to the direction of movement of said flighted conveyor whereby products positioned in said pockets are driven toward one edge of said flighted conveyor;

a second endless belt positioned under a third portion of said flighted conveyor and serving as a bottom for the pockets thereof, said second endless belt being driven in a direction opposite to the direction of movement of said flighted conveyor;

a guide bar positioned below said conveyor between said first and second endless belts and being arranged in a direction perpendicular to the length of said pockets, said guide bar and said one edge of said conveyor being the only means forming a bottom for the pockets passing over said guide bar, said guide bar being spaced from said one edge of said conveyor whereby only the product in each pocket nearest said one edge of said flighted conveyor will be transferred from said first endless belt to said second endless belt and whereby said one product will not be transferred if it is not of a predetermined minimum length;

movement of said products in said pockets across said second endless belt causing said products to move to the edge of said flighted conveyor toward which their smaller diameter ends point;

a first plate positioned under a fourth portion of said flighted conveyor and forming a bottom for the pockets thereof;

feed conveyor means for conveying said products away from said flighted conveyor, said feed conveyor means being positioned below the end of said first plate for directly receiving the products adjacent one of the edges of said flighted conveyor;

means positioned below said first plate for receiving the products adjacent the other edge of said flighted conveyor, said means reversing the orientation of the products received and delivering them to said feed conveyor means;

a second plate positioned below said guide bar and below a fifth portion of said flighted conveyor and serving as a bottom for the pockets thereof, said pockets in said fifth portion receiving products not transferred from said first to said second endless belt;

rod means positioned below a sixth portion of said flighted conveyor and serving as a bottom for the pockets thereof, said rod means being aligned perpendicular to the length of said pockets and being spaced apart whereby only products exceeding a predetermined length will be supported by said rod means; and means for delivering said products to said pockets of said flighted conveyor as said flighted conveyor passes over said table.

20. The apparatus of claim 19 wherein said second endless belt and said third portion of said flighted conveyor are inclined from the horizontal with said second endless belt being driven upwardly.

21. The apparatus of claim 19 wherein said reversing means comprises a bottom plate for receiving said products from said flighted conveyor, an arcuate side plate mounted adjacent said bottom plate to prevent premature ejection of said products, and a revolving plate rotatably mounted on said bottom plate, said products resting against said revolving plate when they are received from said flighted conveyor, rotation of said revolving plate causing the direction of said products to be reversed.

22. Apparatus for processing tapered agricultural products comprising:

a bottomless flighted conveyor, the flights of said conveyor being longer than said product and being spaced apart by a distance less than the length of said product but greater than the diameter thereof whereby pockets are formed for receiving said products;

means forming a bottom for said flighted conveyor, said means including first and second endless belts positioned laterally across said flighted conveyor, each of said belts being driven toward the center of said flighted conveyor whereby said products in said pockets are positioned approximately in the center of said pockets;

a third endless belt positioned beneath a portion of said flighted conveyor, said third endless belt being driven in a direction opposite to the direction of movement of said flighted conveyor whereby movement of said products in said pockets causes said products to move to the edge of said flighted conveyor toward which their smaller diameter ends point;

first means for conveying said products away from one edge of said flighted conveyor; and second means for conveying said products away from the other edge of said flighted conveyor.

23. The apparatus of claim 22 wherein said first and second means comprise first and second feed conveyors positioned below said flighted conveyor to receive products dropped from the pockets thereof.

24. The apparatus of claim 22 wherein said first and second means each comprise a first plate positioned below said flighted conveyor for receiving products dropped from the pockets thereof, a first pusher plate for pushing said products off said first plate and changing their orientation by forty-five degrees, a second plate positioned below said first plate for receiving products pushed off said first plate, and a second pusher plate for pushing said products off said second plate and changing their orientation by forty-five degrees, and wherein a feed conveyor is provided below said second plates of said first and second means for receiving products pushed off said second plates of said first and second means.

25. Apparatus for processing tapered agricultural products comprising conveyor means formed to provide elongated pockets adapted to accommodate tapered products placed therein, the pockets extending laterally of the direction of movement of the conveyor and having a length greater than the length of the products and a width less than the length of the products but greater than their diameter;

means for depositing tapered products into the pockets of the conveyor means without regard to endwise orientation;

means acting upon the products in the pockets for moving the deposited products toward one edge of the conveyor means;

means for removing all but one product from each conveyor pocket after movement of products toward one edge of the conveyor means;

means for thereafter effecting endwise orientation of the products whereby products of one orientation are disposed at one edge of the conveyor means and products of opposite orientation disposed at the other edge;

and means for removing the separately oriented products from the two edges of the conveyor means.

26. Apparatus as in claim 25 in which said last named means includes means for reversing the orientation of products taken from one edge of the conveyor means.

27. Apparatus as in claim 25 together with means for removing undersized products from the conveyor means before effecting endwise orientation of the products.

References Cited

UNITED STATES PATENTS

| | | | |
|---|---|---|---|
| 1,602,716 | 10/1926 | Smith | 209—108 |
| 2,919,525 | 1/1960 | Rothenberger | 198—33 |
| 3,238,694 | 3/1966 | Bartlett et al. | 198—33 X |

ALLEN N. KNOWLES, *Primary Examiner.*